United States Patent [19]
Busick et al.

[11] Patent Number: 5,910,199
[45] Date of Patent: Jun. 8, 1999

[54] METHOD AND APPARATUS FOR FAST THREADING PULLOUT IN A NUMERICALLY CONTROLLED THREADING APPLICATION

[75] Inventors: Rickey L. Busick, Lebanon; Mark F. Steinmetz, Wilmington, both of Ohio

[73] Assignee: Vickers, Incorporated, Maumee, Ohio

[21] Appl. No.: 08/805,506

[22] Filed: Feb. 26, 1997

[51] Int. Cl.[6] .................................................. B23B 5/24
[52] U.S. Cl. .................................. 82/1.11; 82/18; 82/118
[58] Field of Search ............................. 82/1.11, 133, 110, 82/118; 364/474.02, 474.12, 474.16; 408/10–14

[56] References Cited

U.S. PATENT DOCUMENTS

| | | | |
|---|---|---|---|
| 3,624,343 | 11/1971 | Stjernstrom | 219/125 |
| 4,143,310 | 3/1979 | Fujinmawa | 318/571 |
| 4,653,360 | 3/1987 | Compton | 82/18 |
| 4,879,660 | 11/1989 | Asakura et al. | 364/474.15 |
| 4,922,431 | 5/1990 | Carter | 364/474.18 |
| 4,947,336 | 8/1990 | Froyd | 364/474.3 |
| 5,116,173 | 5/1992 | Goldrich | 409/13 |
| 5,282,144 | 1/1994 | Kawamura et al. | 364/474.31 |

*Primary Examiner*—Andrea L. Pitts
*Assistant Examiner*—Mark Williams
*Attorney, Agent, or Firm*—Dinsmore & Shohl LLP

[57] ABSTRACT

A method and apparatus for fast threading pullout in a numerically controlled threading application which includes position determining logic for receiving position command signals from a numerical control and determining the commanded movement of a threading member along at least a primary threading axis and a secondary pullout axis, at least one sensing device for sensing the position of the threading member along at least the primary and secondary axes, velocity calculation structure for generating velocity command signals for actuating the threading member along the primary and secondary axes in accordance with the commanded movements and the sensed position of the member, supplemental velocity structure for applying a supplemental pullout velocity at a predetermined pullout position on the thread to accelerate the member along the secondary axis, and monitoring logic for monitoring the pullout of the threading member along the secondary axis and discontinuing the supplemental velocity after a predetermined portion of the pullout.

20 Claims, 4 Drawing Sheets

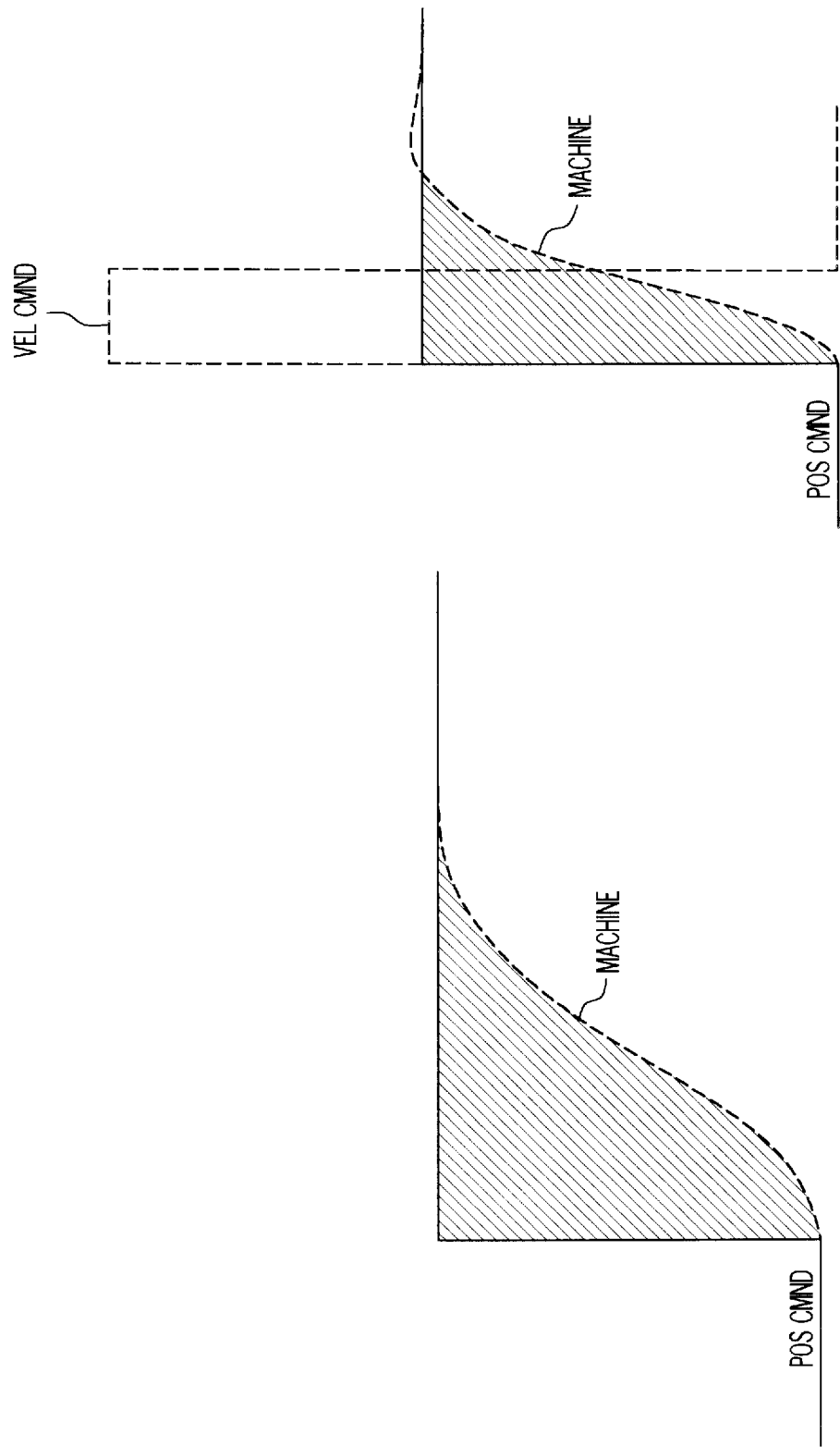

METHOD AND APPARATUS FOR FAST THREADING PULLOUT IN A NUMERICALLY CONTROLLED THREADING APPLICATION

TECHNICAL FIELD

The present invention relates to a method and apparatus for decreasing the time required for pullout from a thread in a thread machining operation and, more particularly, to a method and apparatus for use in a numerically controlled threading application for applying a supplemental velocity to a drive motor associated with a secondary pullout axis to increase the pullout speed of the threading tool along the axis for a portion of the pullout move, while maintaining a lead in the primary threading axis and the integrity of the position mode.

BACKGROUND OF THE INVENTION

Numerical control systems are used to control motors and associated machine members in a variety of applications. One application in which numerical control or NC systems are commonly used is controlling a threading machine. Threading machines are used to cut a thread into a workpiece, to enable the workpiece to be coupled to another part by screwing the workpiece thread into contact with a mating thread on the second part. One type of commonly used threading machine is a lathe, wherein a workpiece is secured between a pair of faceplates or chucks and rotated about a first or primary axis. While the workpiece is rotated, a cutting tool in the machine is driven into contact with the workpiece and moved parallel relative thereto to form the thread.

Numerical control systems are commonly utilized with threading machines in order to control the position of the cutting tool and the rotation of the part during the threading process. These numerical control systems typically include an operator interface or workstation, a programmable controller for controlling the overall operation of the control based upon operator input and threading part programs stored in the control, and a processor for decoding the program instructions and generating data for controlling machine functions. In addition, a motor control is typically used in conjunction with the numerical control for interfacing between the control and the motors driving the machine members, such as the threading tool. To perform a threading operation, a workpiece program containing, among other information, instructions regarding rotation speed, coordinate data for the threading member, and cycle control codes, is loaded into the numerical control. In the numerical control, the program instructions are processed to control machine functions and provide position commands to the motor controls for actuating the motors associated with the threading tool.

In a typical threading operation, the motor control will generate velocity command signals from the position commands for driving the threading member into contact with the workpiece at the initial thread position, and then directing the member along the primary axis at a desired rate to cut the thread into the rotating workpiece. At the end of the thread, velocity commands are transmitted by the motor control to a motor associated with a secondary or pullout axis to drive the cutting member along the secondary axis and away from the workpiece. The velocity commands are generated within a closed position loop for each axis from the sensed position of the threading member and the coordinates dictated by the numerical control.

It is common in a threading machine for the actual position of the machine member to lag the commanded position by a distance referred to as the following error. During threading along the primary axis, this following error results in the physical location of the threading member being slightly behind the commanded position, but does not typically alter the pitch or lead of the thread. However, at the end of the thread this following error can compromise the lead and/or pitch of the thread, due to the delay between the position command to pullout out of the thread and the actual response of the motor driving the pullout. Traditionally, thread pullout techniques have included (a) a direct 90° pullout in which commanded movement along the primary axis is terminated at a pullout point on the thread, and the threading tool is commanded to move only along the secondary pullout axis to drive the threading member from the thread; and (b) a gradual 45° pullout in which position commands are continued along the primary axis as the member is commanded to move along the secondary axis in order to gradually lift the threading member from the workpiece. In the 90° pullout situation, the lag between the actual machine position and the commanded position results in uneven leads at the end of the thread. The unevenness of the leads can prevent a secure coupling between the workpiece thread and the threads on a mating part, resulting in the end of the thread being left unused and, thus, wasted. Likewise, the 45° pullout produces an inconsistent depth at the end of the thread. This inconsistent depth can also prevent a complete coupling between the finished workpiece and a mating part.

The following error between the commanded and actual machine positions can present additional problems when there is a shoulder or obstruction located on the workpiece. In this situation, the delay by the machine member in responding to the position commands can result in the machine member contacting the shoulder as the following error is being consumed, thus causing damage to the workpiece, tool and/or machine.

While it would be theoretically possible to reduce the following error by applying a high velocity command signal to the secondary axis motor at the end position of the thread, the sudden application of this high velocity could produce an out of control condition, resulting in an interruption in the closed loop position mode for the pullout axis, or in the threading member moving out of its operating range and causing damage to the member or part.

Accordingly, based upon the problems associated with existing thread pullout techniques, it is desirable to have an improved method and apparatus for thread pullout which decreases the effects of the machine following error on the thread. In particular, it is desirable to have a method and apparatus for thread pullout which increases the pullout speed of the threading member along the secondary axis, while maintaining consistency in the thread lead and depth, as well as the integrity of the position mode in the numerical control.

SUMMARY OF THE INVENTION

Accordingly, it is a principal object of the present invention to provide a method and apparatus for achieving a fast, controlled threading pullout in a numerically controlled threading application.

In particular, it is an object of the present invention to provide a method and apparatus for fast threading pullout in which an additional, boost velocity is applied to the pullout axis drive motor for a percentage of the pullout move in order to accelerate the movement of the machine member along the pullout axis and decrease the pullout time from the thread.

Another object of the present invention is to provide a method and apparatus for fast threading pullout which maintains the integrity of the closed loop position mode for all of the machine axes.

Yet another object of the present invention is to provide a method and apparatus for fast threading pullout which reduces the effects of machine following error on the primary axis thread.

A further object of the present invention is to provide a method and apparatus for fast threading pullout which may be utilized in any numerically controlled threading application.

A still further object of the present invention is to provide a method and apparatus for fast threading pullout which enables a full depth thread to be produced in close proximity to an obstruction or shoulder.

Still another object of the present invention is to provide a method and apparatus for fast threading pullout which accommodates a range of pullout accelerations Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention as described above, a method and apparatus for fast threading pullout in a numerically controlled threading application is provided which includes position determination logic for receiving position command signals from the numerical control and determining the commanded movement of a threading member along at least a primary threading axis and a secondary pullout axis, at least one sensing device for sensing the position of the threading member along at least the primary and secondary axes, velocity calculation structure for generating velocity command signals for actuating the threading member along the primary and secondary axes in accordance with the commanded movements and the sensed position of the member, supplemental velocity structure for applying a supplemental pullout velocity at a predetermined pullout position on the thread to accelerate the member along the secondary axis, and monitoring logic for monitoring the pullout of the threading member along the secondary axis and discontinuing the supplemental velocity after a predetermined portion of the pullout.

Still other objects of the present invention will become apparent to those skilled in this art from the following description wherein there is shown and described preferred embodiments of this invention, simply by way of illustration, including the best mode contemplated for carrying out the invention. As will be realized, the invention is capable of other different, obvious aspects all without departing from the invention.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 4a is a graphical depiction of thread pullout response in a conventional 90° pullout application; and FIG. 4b is a graphical depiction of thread pullout response utilizing the present invention.

DETAILED DESCRIPTION OF THE PREFERRED EMBODIMENTS

Figure 1:
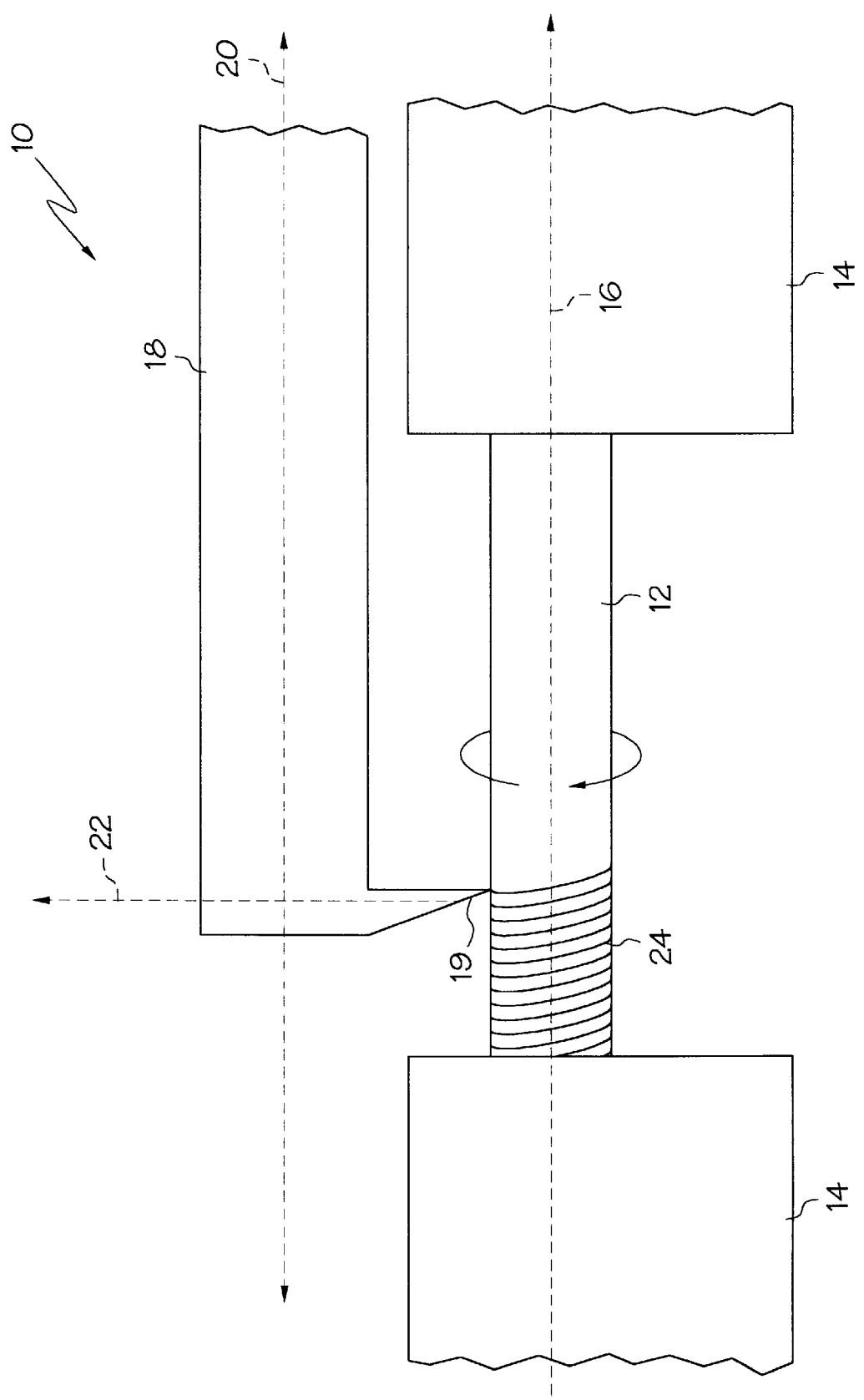
FIG. 1 is a partial, schematic depiction of a numerically controlled threading machine with which the present invention may be used.

Reference will now be made to the presently preferred embodiments of the invention, examples of which are illustrated in the accompanying drawings. As mentioned above, the present invention relates to numerically controlled threading applications and, more particularly, to the rapid, controlled pullout of a threading machine member from a thread. FIG. 1 depicts a representative embodiment of a threading machine 10 in which the present invention may be utilized. In the threading machine 10 shown in FIG. 1, a workpiece 12, which may be a bolt, nut or any other object to be threaded, is held between mounting structure 14, which may comprise one or more chucks, faceplates or any other mounting structure appropriate for the application. A motor (not shown) is associated with the mounting structure 14 for rotating the workpiece about an axis 16 through the workpiece.

The threading machine 10 also includes a conventional cutting or threading member 18 for forming a thread in the workpiece 12. The threading member 18 is preferably actuated by at least two motors, each associated with a separate axis, to enable the member to be placed into a variety of positions relative to the workpiece 12. The axes along which the threading member is actuated include a primary threading axis 20, which is preferably parallel to the axis of rotation 16 for the workpiece, and a secondary axis 22, which is preferably orthogonal to the primary threading axis and constitutes the pullout axis in the present invention. As will be understood, the primary and secondary axes 20, 22 may extend in any direction, depending upon the application.

As shown in FIG. 1, the cutting or working edge 19 of the threading member 18 contacts the workpiece 12 during a threading operation to form a thread 24 in the workpiece. During the threading operation, the position of the threading member 18 is controlled by a numerical control system, described in further detail below, in order to form a thread according to instructions provided in a workpiece program. While FIG. 1 schematically depicts a lathe type of threading machine, it is to be understood that the present invention may be used in any numerically controlled threading application, without departing from the scope of the invention, and that the structure of the particular threading machine may vary depending upon the part being threaded.

Figure 2:
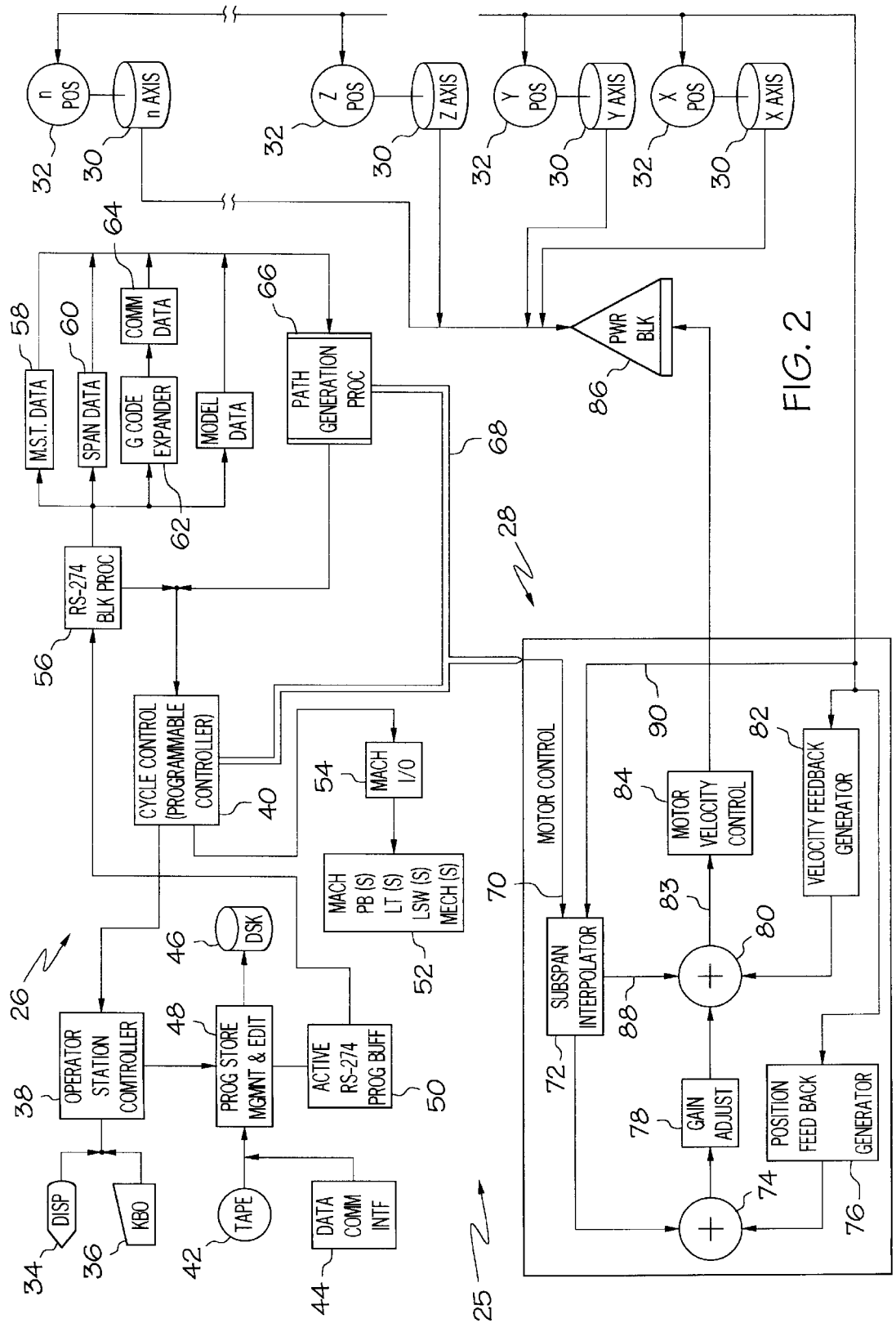
FIG. 2 is a block diagram of a representative machine control with which the present invention may be used.

FIG. 2 depicts a machine control system 25 with which the present invention may be used, and is intended to be only representative of the types of machine control systems in which the present invention may be used. Accordingly, the present invention is not to be limited to this particular machine control, and the invention may be utilized with other machine control systems without departing from the scope of the invention. As shown in FIG. 2, the machine control includes a numerical control system 26, a motor control 28, and a plurality of motors 30. The motor control 28 provides an interface between the numerical control 26 and the motors 30 which actuate the moveable members of the threading machine along particular axes, such as the threading member 18 on its axes 20 and 22. In addition, the motor control 28 provides an interface between the numerical control 26 and position sensing devices, such as position transducers 32, which detect the position of the particular machine members. While the threading machine may include a number of motors and position transducers for actuating various machine members, for clarity the present discussion will focus only on the motors and position transducers associated with the threading member.

As shown in FIG. 2, the numerical control 26 includes an operator or user interface; machine mechanism interface and control; program storage and edit facilities; machine cycle control; and workpiece program processing and path generation control. The operator interface preferably includes a display device 34 such as a CRT or other alphanumeric display device, a manual data entry device such as a keyboard 36, and an operator station controller 38. The operator station controller 38 receives data to be displayed and formats the data for the display device 34. Manual data entries from the keyboard 36 are encoded by operator station controller 38 for distribution to other numerical control system elements. Operator station controller 38 enables manual data input in accordance with the active mode of operation of the machine as determined by the cycle control 40, which will be described below. In addition to the manual data input, workpiece programs may be entered into local storage in the numerical control by bulk data transfer devices such as, for example, a tape reader 42 or a data communication interface 44. Bulk storage of workpiece programs is provided on a disk 46 or similar memory device. A program storage and edit controller 48 manages the communication of data from the input devices 42 and 44 to and from the disk 46, as well as to and from the operator station controller 38. A workpiece program buffer 50 is provided for active programs, and program instructions are transferred for execution from the buffer.

The overall cycle of operation of the numerical control 26 is controlled by the cycle control 40. Cycle control 40 preferably operates as a conventional programmable controller to execute control programs relating to machine push buttons, lights, limit switches and mechanisms such as transmissions, tool changers, and workpiece transfer devices, as well as the cycle of operation of the controlled machine. The machine elements are indicated generally by block 52 and are monitored and controlled through a machine input-output interface 54. In controlling the operation cycle of the machine, cycle control 40 effects transfer of workpiece program instructions from the buffer 40 to a block processor 56. Further, cycle control 40 monitors machine status and effects the appropriate response to error conditions.

The workpiece programs comprise blocks of instructions containing coordinate data, tool data, spindle speed data, and miscellaneous function data and cycle control codes. In the present invention, the workpiece programs also preferably contain thread instructions such as pitch, length and lead distance, a "P" word instruction indicating that a fast pullout is to be performed, and a value with the "P" word instruction specifying the thread position at which the fast pullout is to be initiated. Preferably, the fast pullout position is specified as a distance from the end of the thread on the primary axis. A "P" word instruction may have a value, such as 0.2, indicating that the pullout is to occur 0.2 mm from the thread end point, or it may have a value of zero, indicating that the fast pullout is to begin when the command position along the primary threading axis reaches the end of the thread. In this case, the fast thread pullout occurs during the machine following error time lag on the primary threading axis.

In addition to containing a "P" word instruction, the workpiece or threading block program may also specify the voltage level to be applied to the motor velocity control during a fast pullout in order to accelerate the movement of the threading member along the pullout axis. In the representative embodiments disclosed herein, the boost voltage may be anywhere in a range of 0–10 volts, with the default boost voltage being 10 volts. As an alternative to including the voltage level in the threading block program, the boost voltage may be programmed at the beginning of a series of threading block programs in the control 26. In addition to the boost voltage and "P" word instructions, the threading block program also preferably includes instructions regarding the percentage or duration of the pullout move during which the boost voltage is to be applied. This percentage is based upon the rotation speed, velocity of the threading member, and total pullout distance on the secondary axis, and may be any value between 0 and 100%. Preferably, the boost duration or percentage is selected on a part by part basis to minimize overshoot on a pullout, while still clearing the thread as quickly as possible and maintaining the thread member under full closed loop position control. In the representative embodiments discussed herein, the default boost duration is preferably 50% of the pullout move.

The block processor 56 decodes each block of instructions and distributes data from the programs as appropriate for control of the machine functions. Miscellaneous function, spindle speed and tool data associated with machine functions such as tool selection, transmission speed changes and mechanism control are placed in the data store 58. Coordinate data specifying end points for the machine member axes of motion are placed in the data store 60. Code expander 62 operates on cycle control codes to effect selection of commissioning data from the commissioning data store 64 and to select the desired mode of path generation.

Path generation processor 66 periodically produces coordinate axis position commands for controlling movement on the axes, and updates the interpolator in accordance with the machine operations specified by the active workpiece program instructions. The position commands produced by path generation processor 66 reflect the rate of change of position of all machine axes as defined by the programmed coordinates, feed rates, and cycle commands for the actual tool path.

In a preferred embodiment, communications between the motor control 28 and processor 66 are by way of data bus 68, which preferably conforms to the IEEE 796-88 signal specifications for a P1 connector. Data entered under control of the operation station controller 38 or from the workpiece program, as well as data from commissioning data store 64, are all available over the data bus 68 to the motor control 28.

As mentioned above, motor control 28 serves as an interface between the numerical control system 26, motors 30 and position transducers 32. The motor control 28 shown in FIG. 2 illustrates the functional elements used to control a single one of the motors 30. With the exception of the position loop interpolator 72, these functional elements will be duplicated for each motor associated with the control. This description will focus on the functional elements as they are utilized for controlling the motor associated with the secondary or pullout axis, in order to best describe the features of the invention.

During position command update intervals, the motor control 28 receives input position command signals from processor 66 over data bus 68. These input position command signals specify the initial and end coordinate axis positions for the thread on the primary threading axis, the end of span position on the secondary or pullout axis, and instruct the motor control 28 regarding the pitch, depth and lead for the thread. In addition, during the update interval the motor control 28 receives instructions regarding the presence of a "P" word or fast pullout command, the "P" word value, the percentage or distance of the pullout move during which the boost velocity is to be applied, and the voltage level to be applied to generate the boost or supplemental velocity. In the representative embodiments discussed herein, the position commands and other instructions are preferably updated in the motor control 28 at the initiation of each new part to provide coordinate axis position commands and fast pullout instructions pertaining to the part.

In the motor control 28, the position commands and fast pullout instructions are input as shown at 70, to a position determination logic structure, such as an interpolator 72. In the representative embodiments, interpolator 72 is preferably a software component with a software/hardware interface for generating analog signals from digital software commands. The interpolator 72 processes the position command signals and instructions, and generates subspan position commands for each of the axes for dictating movement of the threading member along the axes, as well as supplemental velocity signals for a fast pullout. The interpolater 72 preferably outputs a new subspan position command for each axis every 1–3 milliseconds, with the precise timing depending upon the speed of the processor utilized in the interpolator. The subspan commands are output as a voltage signal to a summing junction 74 associated with the axis. The subspan command voltage is summed at junction 74 with a voltage signal from a position feedback generator 76, which receives input from the position transducers 32 regarding the position of either the motor 30, or the machine member actuated by the motor.

From this input, the position feedback generator 76 generates a voltage signal which corresponds to the measured position of the member along the axis. The output from the summing junction 74 is a position error corresponding to the difference between the commanded position and the measured position of the machine member, which, for purposes of this example, is the threading member 18. The greater the error between the actual and commanded positions, the greater the position error signal or voltage.

The position error from the summing junction 74 is amplified by a gain adjust device 78, and then applied to a second summing junction 80. Also applied to the summing junction 80 is a velocity signal from a velocity feedback generator 82. Velocity feedback generator 82 determines the velocity of the motor 30 from the position feedback signals from the transducer 32 associated with the axis. A velocity error is produced by summing junction 80 as a function of the difference between the adjusted position error and the actual velocity of the motor. The velocity error on line 83 represents the motion requirements for the motor.

The velocity error signal is input to a motor velocity control 84 which computes a required current command signal for actuating the motor in accordance with the required motion. The current command signal from the velocity control 84 is applied to a power block 86, from which current is selectively applied to the motor to actuate the motor and attached threading member. A current limiting device (not shown) may be provided between the motor velocity control 84 and the power block 86 in order to limit the commanded current, and to prevent a current overload situation in the power block which could damage the switching devices which control switching of the current to the motor.

In the present invention, software in the position loop interpolator 72 compares the subspan position commands with the "P" word value input from the numerical control. As each subspan position is generated, the subspan coordinates along the primary threading axis are compared to the "P" word value, to determine whether the commanded position has reached the preselected pullout position. If the subspan position is greater than the "P" word value, then only the subspan position commands are output from the interpolator 72 to the summing junction 74. However, if the subspan coordinates along the primary threading axis are less than or equal to the "P" word value, then the interpolator 72 generates a supplemental or boost velocity command signal in addition to the subspan position commands. This supplemental velocity signal is applied as a voltage to the summing junction 80 as shown at 88. The boost voltage 88 is added to the adjusted position error and velocity feedback signals at junction 80 to provide an increased velocity command signal for the secondary axis which is applied to the motor velocity control 84.

From this increased velocity command signal, the velocity control 84 generates an increased current command, which when applied to the motor 30, accelerates the movement of the motor and, thus, the threading member along the secondary axis. While the boost voltage is applied, the normal position loop mode is maintained for each of the axes, and the interpolator 72 continues to generate subspan position commands to command movement of the threading member along each of the axes. Thus, the boost velocity is added to the normal position loop commanded velocity for the secondary or pullout axis.

In addition to applying the boost voltage to junction 80, the interpolator 72 also increases the excess error and servo fail limits for the control during the fast pullout to prevent an error condition from occurring should the deviation between the actual position of the accelerating threading member and the commanded position exceed the acceptable range set in the control.

In the present invention, the supplemental velocity signal is computed in the interpolator 72, such that the boost voltage is output to the pullout axis drive motor as the fast pullout is initiated. Preferably, the supplemental velocity command voltage remains constant for the duration of the fast pullout. During the fast pullout, the position of the threading member along the secondary axis is monitored by the interpolator 72. Particularly, the interpolator 72 preferably monitors the threading member position through feedback signals on line 90 from the appropriate transducer 32. The threading member position, as detected by the transducer 32, is compared with the boost duration instructions from the thread block program. When the threading member 18 reaches the pullout position or percentage of the pullout move designated in the threading block program, the interpolator 72 sets the supplemental velocity command to zero, thereby terminating the boost voltage and corresponding supplemental current to the motor.

After the supplemental velocity command is set to zero, the threading member continues the pullout move along the secondary axis based upon the velocity command signals calculated from the adjusted position error and velocity feedback from generator 82, until the commanded positions reach the end position on the pullout axis. In addition, after the pullout is complete, the excess error and servo fail limits are reset in the control to their original values.

In alternative embodiments, rather than setting the supplemental velocity command to zero at the end of the boost duration, the supplemental velocity command could be gradually decreased over the last half of the pullout move by either linearly or nonlinearly decreasing the boost voltage and, thus, the velocity from the maximum to zero. Also, the supplemental velocity could be gradually decreased by stepping the velocity command to zero at the midpoint of the move and computing a position command that results in a velocity command output from the position loop that is equal to the current feedback velocity, and then interpolating the position command for the remainder of the span in a controlled deceleration.

Figure 3:
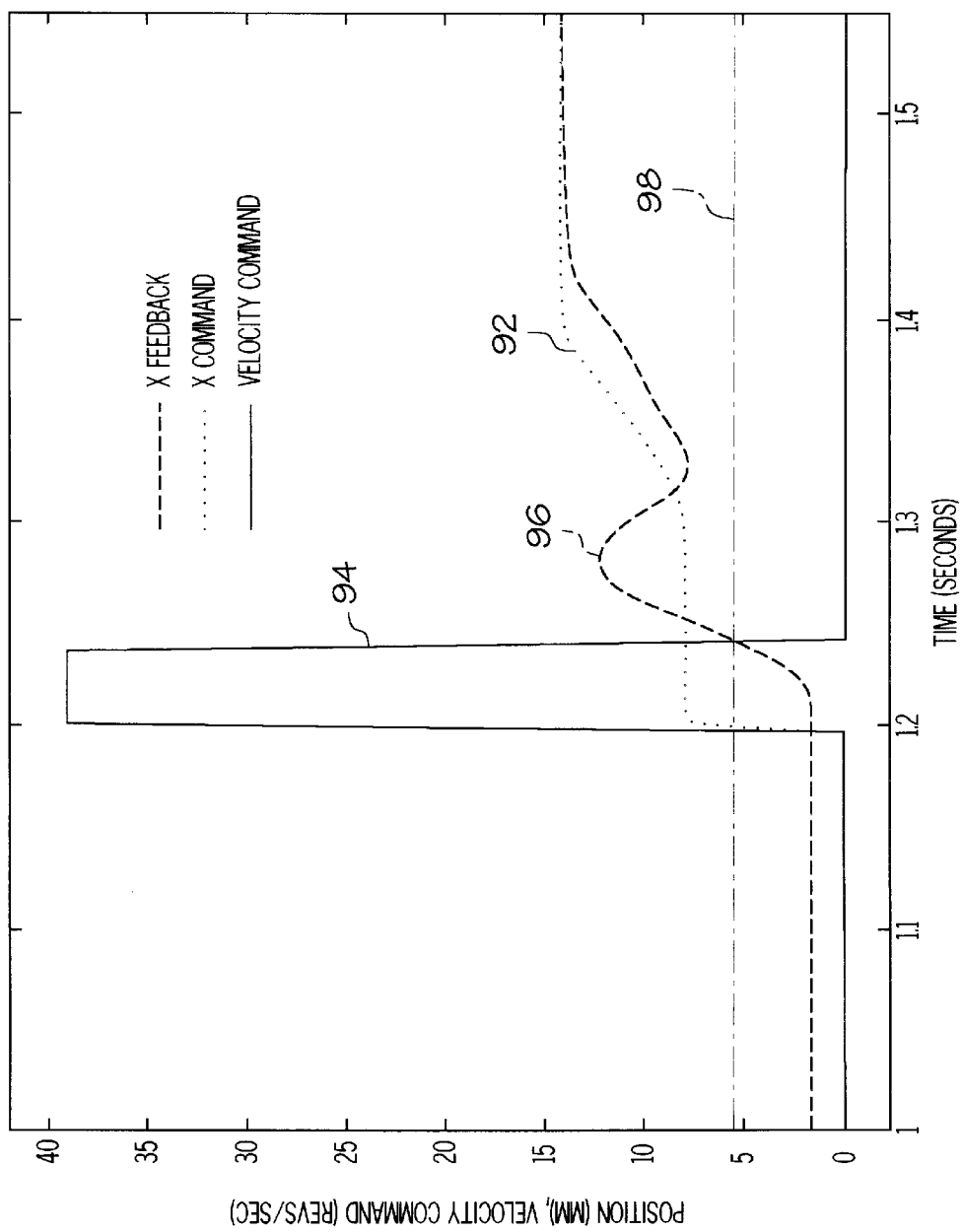
FIG. 3 is a graphical depiction of a threading pullout operation in accordance with the present invention.

FIG. 3 illustrates an exemplary relationship between the boost velocity, commanded machine position, and actual machine position during a threading pullout. In the example shown in FIG. 3, the threading member reaches the desired pullout position at approximately 1.2 seconds. At the pullout position, the interpolator 72 generates position command signals, identified as 92, from which are generated velocity commands for actuating the member to pullout or move along the secondary axis. As the position commands are generated, a boost velocity signal, identified as 94, is also applied by the interpolator 72 to the secondary axis velocity control to accelerate the pullout movement. The actual movement of the machine is identified as 96. As shown in FIG. 3, when the boost velocity command is applied, a slight overshoot in the actual machine position is created, however, the overshoot remains below the pullout end position and above the part surface shown as line 98 and, thus, does not cause an out of control condition or damage.

As shown in FIG. 3, in the present invention a small lag still remains between the commanded position 92 and the actual machine position 96. However, this lag is considerably reduced from that present in the conventional direct pullout technique, as illustrated in FIGS. 4a and 4b. For example, FIG. 4a depicts a threading machine response to a position command for a direct 90° pullout, while FIG. 4b depicts the same threading machine response to a commanded 90° pullout, but with the addition of a supplemental velocity command at the initiation of the pullout. The time lag between the commanded position and the actual machine position is indicated by cross-hatching in the figures. As can be seen in FIG. 4b, the addition of the supplemental velocity to the commanded velocity results in a significant reduction in the machine following error, thus reducing the time required to withdraw the threading member from a thread.

Accordingly, the present invention provides a method and apparatus for fast threading pullout in which a supplemental velocity is added to the position loop commanded velocity at a pullout position on the thread, in order to accelerate the threading member along the pullout axis and away from the thread. Because the threading member is accelerated away from the thread, the following error between the position command to pullout and the actual pullout of the machine is reduced. In addition, because each of the axes remains in a normal closed loop position mode during the fast pullout, and the boost velocity is added to the commanded velocity without interrupting the position command signals, the present invention maintains the integrity of the position mode. Further, a range of boost voltage levels may be used in the present invention, thereby providing for varying acceleration of the threading member during pullout. Also, because the threading member is accelerated away from the thread, rather than moving at the commanded velocity, the present invention improves the ability of the threading tool to clear shoulders and obstructions on the workpiece.

The foregoing description of preferred embodiments of the invention has been presented for purposes of illustration and description. It is not intended to be exhaustive or to limit the invention to the precise form disclosed. Several alternatives have been described, and other modifications or variations will become apparent to those skilled in the art in light of the above teachings. The embodiments shown and described were chosen in order to best illustrate the principles of the invention and its practical application, to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for use with a numerically controlled threading machine for decreasing the time for pullout of a machine member from a thread on a workpiece, the method comprising the steps of:

receiving position command signals for determining commanded movement of the machine member along a pullout axis;

applying a first velocity signal to the machine member based on the commanded movement for driving the machine member along the pullout axis; and applying a supplemental velocity signal to the machine member along the pullout axis when the commanded movement reaches a selected position on the thread to generate an accelerated pullout movement of the machine member along the pullout axis, wherein the supplemental velocity signal is applied in addition to the first velocity signal.

2. The method of claim 1, wherein the supplemental velocity signal is added to the first velocity signal to drive the machine member at a rate equal to the sum of the velocity signals.

3. The method of claim 1, wherein the supplemental velocity signal is applied to the machine member for only a portion of the pullout movement along the pullout axis.

4. The method of claim 1, wherein the thread is formed along a primary threading axis and the selected position corresponds to a distance from an end of the thread in the primary threading axis.

5. The method of claim 1, further comprising the steps of monitoring the accelerated pullout movement of the machine member and discontinuing the supplemental velocity signal after a predetermined distance on the pullout axis.

6. The method of claim 5, wherein the monitoring step comprises sensing a position of the machine member on the pullout axis, determining a distance between the sensed position and the selected position at which the supplemental velocity is applied, and comparing the distance to an end position on the pullout axis.

7. The method of claim 6, wherein the supplemental velocity signal is discontinued if the distance exceeds a predetermined percentage of a span between the thread and the end position on the pullout axis.

8. The method of claim 5, wherein the predetermined distance comprises a percentage of a pullout move for the machine member.

9. The method of claim 8, wherein the percentage is about fifty percent.

10. The method of claim 5, wherein the step of discontinuing the supplemental velocity signal comprises decreasing the signal to zero between the predetermined position and an end position on the pullout axis.

11. The method of claim 1, further comprising the steps of receiving the selected position from a numerical control, monitoring primary threading axis position command signals for commanding movement of the machine member along a primary threading axis, and applying the supplemental velocity signal when a primary threading axis position command signal reaches the selected position.

12. The method of claim 1, wherein the supplemental velocity signal comprises a voltage applied to a velocity control for a motor driving the machine member on the pullout axis.

13. A method for use with a numerically controlled threading machine for accelerating a pullout of a machine member from a thread on a workpiece, the method comprising the steps of:

receiving position command signals from a numerical control for determining commanded movement of the machine member;

generating a first velocity signal based on the commanded movement for driving the machine member along a pullout axis;

generating a supplemental velocity signal for movement of the machine member along the pullout axis;

adding the supplemental velocity signal to the first velocity signal when the commanded movement of the machine member reaches a selected position on the thread, to produce an accelerated pullout movement of the machine member along the pullout axis;

monitoring the accelerated pullout movement of the machine member; and discontinuing the supplemental velocity signal after a portion of the pullout movement.

14. The method of claim 13, wherein the supplemental velocity signal comprises a voltage.

15. The method of claim 13, further comprising the steps of receiving the selected position from the numerical control, and monitoring the position command signals from the numerical control, wherein the supplemental velocity signal is generated and added when a position command signal reaches the selected position.

16. The method of claim 15, wherein the selected position is set at a predetermined distance from an end of the thread in a primary threading axis.

17. An apparatus for use with a numerically controlled threading machine for decreasing the time for pullout of a machine member from a thread on a workpiece along a pullout axis, the apparatus comprising:

position determining logic structure in communication with the numerical control to receive position command signals from the numerical control and determine commanded movement of the machine member;

at least one machine member position sensor;

velocity calculation structure in communication with the position determining logic structure and the sensor to determine a commanded velocity for the machine member from the commanded movement and the sensed position of the machine member; and supplemental velocity structure adapted to apply a supplemental pullout velocity to the machine member along a pullout axis when the commanded movement reaches a preselected position the supplemental pullout velocity being applied to the machine member in addition to the commanded velocity.

18. The apparatus of claim 17, further comprising a velocity control device for generating a motor current during a fast pullout from a sum of a commanded velocity along the pullout axis and the supplemental pullout velocity.

19. The apparatus of claim 17, further comprising monitoring logic in communication with the sensor to monitor the pullout of the machine member along the pullout axis and discontinue the supplemental velocity after a predetermined portion of the pullout.

20. The apparatus of claim 17, wherein the supplemental velocity structure comprises a position loop interpolator.

* * * * *

UNITED STATES PATENT AND TRADEMARK OFFICE
CERTIFICATE OF CORRECTION

PATENT NO. : 5,910,199
DATED : June 8, 1999
INVENTOR(S) : Rickey L. Busick and Mark F. Steinmetz It is certified that error appears in the above-indentified patent and that said Letters Patent is hereby corrected as shown below:

Claim 17, column 12, line 25, between "position" and "the" insert --,--

Signed and Sealed this

Fifth Day of October, 1999

Attest:

Q. TODD DICKINSON

Attesting Officer

Acting Commissioner of Patents and Trademarks